F. E. REED.
ICE SAWING MACHINE.
APPLICATION FILED JUNE 21, 1913.

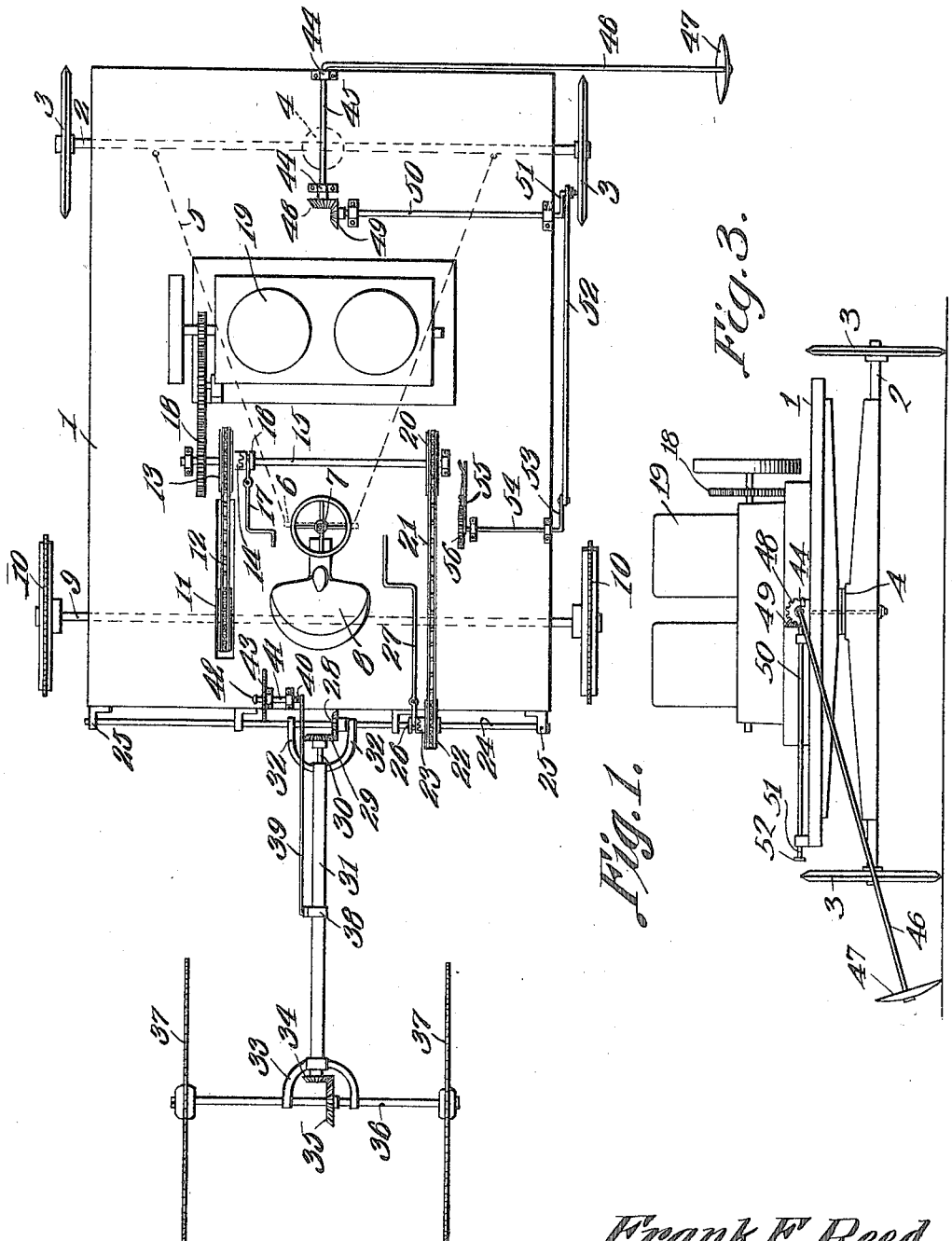

1,141,268.

Patented June 1, 1915.
2 SHEETS—SHEET 2.

Witnesses

Frank E. Reed,
Inventor
by C. A. Snow & Co.
Attorneys

UNITED STATES PATENT OFFICE.

FRANK E. REED, OF LACON, ILLINOIS, ASSIGNOR OF FORTY-FIVE ONE-HUNDREDTHS TO CHARLES C. ROTH, OF LACON, ILLINOIS.

ICE-SAWING MACHINE.

1,141,268.  Specification of Letters Patent.  Patented June 1, 1915.

Application filed June 21, 1913. Serial No. 775,111.

*To all whom it may concern:*

Be it known that I, FRANK E. REED, a citizen of the United States, residing at Lacon, in the county of Marshall and State of Illinois, have invented a new and useful Ice-Sawing Machine, of which the following is a specification.

The present invention relates to improvements in ice sawing machines and the invention aims to improve the marker and the actuating mechanism whereby the marker is swung from side to side.

Figure 4:
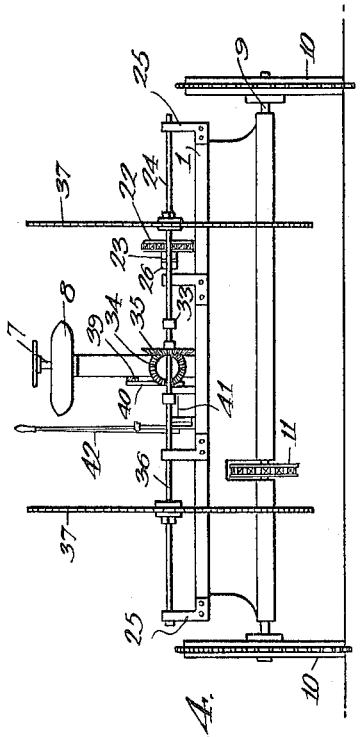
Figure 2:
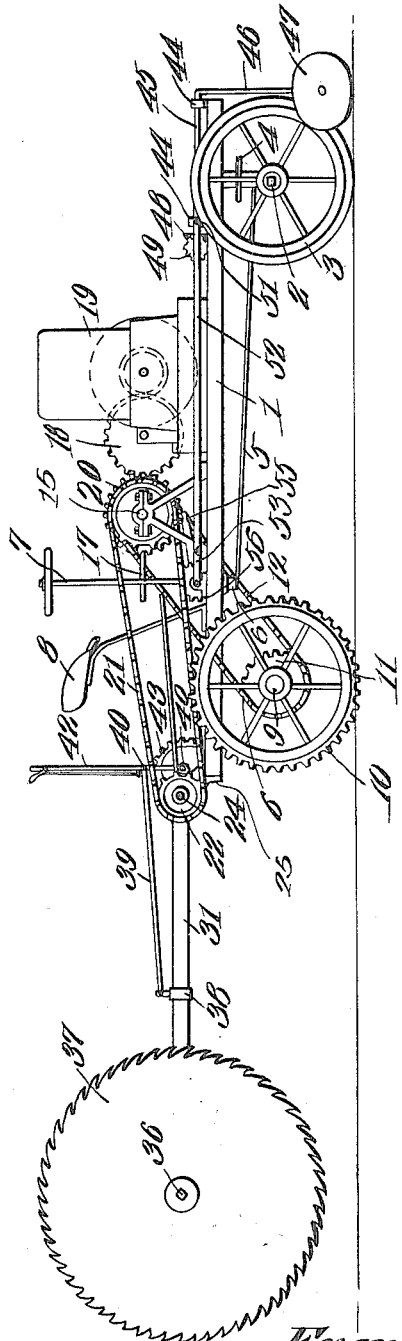

In the drawings—Figure 1 is a top plan view of the complete mechanism. Fig. 2 is a side elevation thereof, one of the shaft-supporting brackets being removed and the shaft being sectioned. Fig. 3 is a front elevation thereof, distant parts being omitted. Fig. 4 is a rear elevation thereof distant parts being omitted and certain parts being sectioned.

Referring to the drawings, the numeral 1 designates the platform supporting structure or frame of the vehicle, which is provided with the forward steering axle 2 and the steering wheels 3. The fifth wheel or steering connection 4 connects the axle 2 to the platform 1 and in order that the axle 2 may be properly operated to steer the machine, the cables 5 are connected to the axle and to the cross arm 6 carried by the steering wheel operated staff 7. This staff 7 is disposed in ready access to the operator seated upon the seat 8.

The rear axle 9 is the drive axle, and is provided with the tractor wheels 10, the peripheries of which are provided with ice engaging teeth, as clearly shown.

The sprocket 11 is keyed to the drive shaft 9 and has led thereover a sprocket chain 12 which is also connected to the rotatably mounted sprocket 13 which carries the clutch member 14 upon the shaft 15. A slidable clutch member 16 is disposed to slide upon the shaft 15 for coaction with the clutch member 14, so that when the lever 17 is operated, the shaft 15 is connected to or disconnected from the drive shaft 9. The hand lever 17 is disposed in ready access to the operator, as clearly illustrated in Fig. 1.

The shaft 15 is connected by gears 18 to the prime mover 19, which in the present instance is an explosion engine.

In order to operate the sawing mechanism of the present apparatus, the sprocket 20 is keyed upon the shaft 15, and has led thereover the sprocket chain 21, which extends to the rear and passes over the freely rotatable sprocket 22, the same being provided with the clutch member 23. The sprocket wheel 22 and clutch member 23 are rotatably mounted upon the shaft 24, which as clearly shown, is journaled in the brackets 25 carried upon the rear of the platform or frame 1 of the machine. A slidably mounted clutch member 26 is splined upon the shaft 24 in operable relation to the clutch member 23 so that the shaft 24 may be rotated at will. A lever 27, disposed in ready access to the operator, is mounted to control the slidable clutch member 26.

Keyed upon and rotatable with the shaft 24 is the bevel pinion 28, which meshes with the bevel pinion 29 carried upon the inner end of the shaft 30. This shaft 30 is rotatably mounted in the tube or sleeve 31, provided with the forked terminals 32 which are pivotally connected to the shaft 24, so that the tube 31 and shaft 30 may be moved vertically to and from the surface traversed. The outer end of the sleeve 31 is provided with the forked terminals 32, while keyed upon the outer extreme end of the shaft 30 is a bevel pinion 34 meshing at all times with a bevel pinion 35 keyed upon the saw carrying shaft 36. This saw carrying shaft 36 is journaled in the terminals of the fork 33, and has keyed upon its respective ends, the saws 37.

It will thus be seen that by the operation of the clutch composed of the members 23 and 26, the prime mover 19 may be operably connected to rotate the shafts 30 and 36 and consequently the saws 37.

In order to move the saws to and from the surface traversed and also to regulate the depth of cut thereof, a sleeve 38 is connected to the tube 31, and has operably connected thereto, a rod 39, said rod 39 being extended toward the platform of the machine and connected to the crank 40 of the short shaft 41. This short shaft 41 is oscillated through the instrumentality of the hand lever 42, which is controlled and locked in any desired position by means of the pawl and segment means 43.

By this construction, it will be seen that an operator seated in the seat 8, will control through the levers 17, 27 and 42 the operation of the rear driving shaft and wheels and also the rotation of the saws 37 and the relation of the saws 37 to the surface traversed.

In order to provide a means for marking upon the ice, so that the operator may be guided when making the next cut by the saws 37, the two journals 44 are carried by the platform or frame 1 at the front upper surface thereof and have journaled for oscillation therein, a primary shaft 45, whose outer end 46 forms an arm which is disposed to swing in front of the frame of the machine and carries upon its lower end, the concaved marking disk 47.

A bevel gear 48 is keyed upon the inner end of the shaft 45 and meshes with the bevel gear 49 of the transverse or secondary shaft 50. This shaft 50 is provided with a crank arm 51 upon the outer end thereof to which is connected the connecting rod 52. This rod 52 extends rearwardly and is connected to the crank 53 of the short transverse shaft 54, which in reality is the operating shaft of the present device. The operating lever 55 is connected to the shaft 54 and is provided with the pawl and segment device 56 for locking the parts in the desired adjusted position.

The rod 52 and associated parts constitute a means operatively connected with the secondary shaft 50 for actuating the same from a point to the rear of the engine 19 thereby to dispose the marker 47 on opposite sides of the supporting structure.

What is claimed is:

In an ice-sawing machine, a supporting structure; an ice saw carried thereby; an engine on the supporting structure and operatively connected with the saw; a primary shaft extended substantially parallel to the line of advance of the machine and journaled on the supporting structure in front of the engine, the primary shaft embodying an arm disposed transversely of the line of advance of the machine; a marker on the arm adjacent its end; a secondary shaft disposed transversely of the line of advance of the machine and journaled on the supporting structure; intermeshing beveled pinions on the shafts; and means operatively connected with the secondary shaft for actuating the same from a point to the rear of the engine thereby to dispose the marker on opposite sides of the supporting structure.

In testimony that I claim the foregoing as my own, I have hereto affixed my signature in the presence of two witnesses.

FRANK E. REED.

Witnesses:
E. D. KENWARD,
JAY H. MAGOON.